W. D. EARL.
COOKING UTENSIL.
APPLICATION FILED MAY 15, 1908.
No. 906,399.
Patented Dec. 8, 1908.
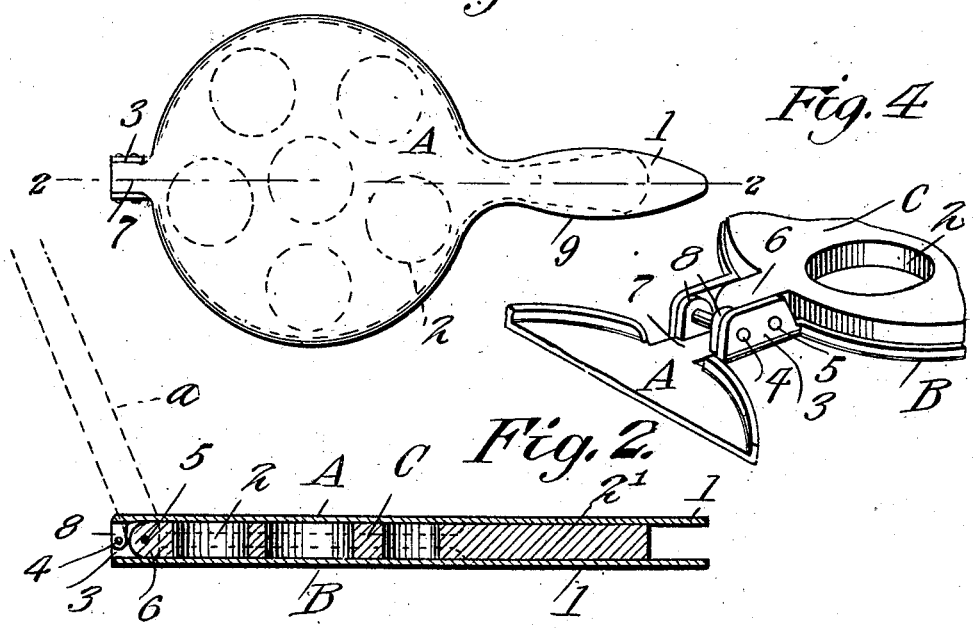
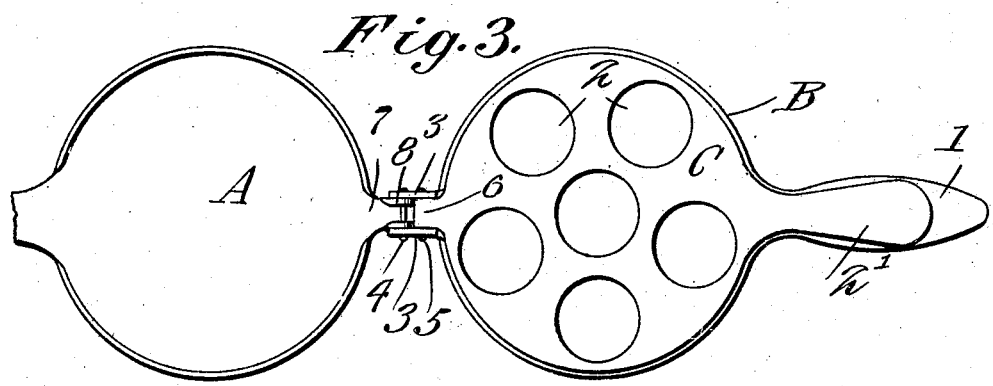
Inventor,
Ward D. Earl.
Witnesses:
Joe. P. Wahler
C. Bradway
By Victor J. Evans.
Attorney

UNITED STATES PATENT OFFICE.

WARD D. EARL, OF SEATTLE, WASHINGTON.

COOKING UTENSIL.

No. 906,399.　　　Specification of Letters Patent.　　　Patented Dec. 8, 1908.

Application filed May 15, 1908. Serial No. 433,060.

*To all whom it may concern:*

Be it known that I, WARD D. EARL, a citizen of the United States, residing at Seattle, in the county of King and State of Washington, have invented new and useful Improvements in Cooking Utensils, of which the following is a specification.

This invention relates to a culinary utensil which is intended more especially for frying eggs, although it may be used for other purposes.

The object of the invention is the provision of a utensil comprising two hingedly-connected pan sections, one of which serves as a cover, and an egg holder hingedly connected with one of the sections and having pockets for receiving the individual eggs, the holder being of metal and of considerable mass so that when once heated, it will retain its heat for a long time.

Another object of the invention is the employment of a novel hinge construction between the pan sections and the holder whereby the utensil can be opened and closed and the holder raised from the frying section when it is desired to remove the eggs or other food.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one object of the invention, Figure 1 is a plan view of the utensil. Fig. 2 is a central longitudinal section thereof on line 2—2, Fig. 1. Fig. 3 is a plan view showing the top section open. Fig. 4 is a fragmentary perspective view showing the hinged connections between the parts.

Similar reference characters are employed to designate corresponding parts throughout the several views.

Referring to the drawing, A and B designate the cover and frying sections, respectively, of the utensil which are of any desired shape and formed with handles 1, the inner faces of the sections being flat so as to fit closely to the opposite sides of the inner section C that constitutes the egg holder, the said latter section having egg-receiving pockets 2. The section C is cast aluminum or other suitable material of considerable mass so that when once heated, it will retain its heat for a long time, and the same is provided with a handle portion 2' that is disposed between the handles 1 of the sections A and B. The section B has upwardly-extending lugs or ears 3 that are provided with apertures for receiving separate pintles 4 and 5, and on the egg-holder section C is a radially-extending lug 6 that fits between the ears 3 and through which the pintle 5 extends so as to hingedly connect the sections B and C together. The section A has an extension 7 that is formed into ears 8 that are disposed between the ears 3 and are hingedly connected with the latter by the pintle 4. By this means, the cover section A can be swung open or closed independently of the egg holder C, and when the cover section is open, the egg holder can be raised and swung backwardly to the tilted or dotted line position a, Fig. 2, where it rests on the ears 8 that constitute stops for limiting the opening movement of the said egg holder. When the egg holder is in this position, the fried eggs can be readily removed from the frying section B.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the appended claims.

Having thus described the invention, what I claim is:—

1. In a utensil of the class described, the combination of a fry pan section having upwardly-extending ears, a cover section having ears disposed between the first-mentioned ears, a pintle passing through the ears for connecting the sections together, an egg holder having pockets, means for pivotally connecting the egg holder with the fry pan section at a point located inwardly from the pintle to permit the egg holder to rest on the ears of the cover section when the utensil is open.

2. In a utensil of the class described, the combination of a fry pan section consisting of a flat body, a handle connected with the body, and ears disposed at the opposite side of the body from the handle, a cover section of substantially the same form as the fry pan section, a handle thereon, an extension on the cover section disposed between the said lugs, a pintle passing through the extension and ears to hingedly connect the sections, and a disk-shaped egg holder having egg-holding pockets provided with a lug disposed between the said ears and hingedly connected therewith.

In testimony whereof I affix my signature in presence of two witnesses.

WARD D. EARL.

Witnesses:
H. D. YOUNKMAN,
J. R. ENSMINGER.